United States Patent [19]

Mizunuma et al.

[11] Patent Number: 4,579,606
[45] Date of Patent: Apr. 1, 1986

[54] METAL SHEET THAT SELECTIVELY ABSORBS SOLAR RADIATION

[75] Inventors: Takehisa Mizunuma, Kawasaki; Seizaburo Abe, Yokohama; Jiro Ohno, Yokohama; Hisashi Kobayashi, Yokohama, all of Japan

[73] Assignee: Nippon Steel Corporation, Tokyo, Japan

[21] Appl. No.: 657,485

[22] Filed: Oct. 3, 1984

Related U.S. Application Data

[60] Division of Ser. No. 541,491, Oct. 17, 1983, Pat. No. 4,491,487, which is a continuation of Ser. No. 318,564, Nov. 5, 1981, abandoned.

[30] Foreign Application Priority Data

Nov. 6, 1980 [JP] Japan ................................ 55-156392

[51] Int. Cl.⁴ ............................ C23F 5/02; C23F 7/00
[52] U.S. Cl. ................................. 148/31.5; 148/6.21; 428/623
[58] Field of Search ............... 428/623; 148/31.5, 6.21

[56] References Cited

U.S. PATENT DOCUMENTS

| | | | |
|---|---|---|---|
| 4,026,737 | 5/1977 | Tekahari et al. | 148/6.21 |
| 4,097,311 | 6/1978 | Ishibashi et al. | 148/31.5 |
| 4,491,487 | 1/1985 | Mizunuma et al. | 148/6.21 |

FOREIGN PATENT DOCUMENTS

| | | |
|---|---|---|
| 2423877 | 12/1974 | Fed. Rep. of Germany . |
| 2288796 | 6/1976 | France . |
| 53-34653 | 9/1978 | Japan ................. 126/901 |
| 54-15327 | 6/1979 | Japan . |

*Primary Examiner*—Veronica O'Keefe
*Attorney, Agent, or Firm*—Cushman, Darby & Cushman

[57] ABSTRACT

In order to obtain a film having a low electric resistance and a good selective absorption property of solar radiation, good rust proofing and good weldability, a stainless steel is dipped in a chemical conversion bath, in which sodium bichromate or potassium bichromate is mixed with sulfuric acid at a predetermined proportion to one another, in accordance with the method of the present invention. The product film of the present invention comprises metal oxides or metal hydroxides with metal (Fe+Cr) finely dispersed therein.

5 Claims, 11 Drawing Figures

METAL SHEET THAT SELECTIVELY ABSORBS SOLAR RADIATION

CROSS-REFERENCE TO RELATED APPLICATIONS

This application is a division of our earlier application Ser. No. 541,491 filed Oct. 17, 1983, now U.S. Pat. No. 4,491,487, which in turn is a continuation of our application Ser. No. 318,564 filed Nov. 5, 1981, now abandoned.

BACKGROUND OF INVENTION

1. Field of Invention

The present invention relates to a method for producing a selective absorption sheet of solar radiation made of stainless steel and having an improved selective absorption property of solar radiation as well as having improved properties in rust proofing, weldability, heat resistance and the like. The present invention is also related to a selective absorption sheet of solar radiation made of stainless steel and produced by the method mentioned above.

The selective absorption sheet of solar radiation is required to have a good selective absorption property of the solar radiation, i.e. a good energy-transmission property within the wave length of solar light and the lowest possible energy emission of solar light having a wave length range corresponding to that of a radiation spectrum of a black body at 100° C. In addition, it is necessary for the practical application of the selective absorption sheet of solar radiation to provide such sheet with good rust proofing and heat resistance, and it is necessary for assembling the pieces of such sheet as a solar collector to provide such sheet with a good weldability.

2. DESCRIPTION OF PRIOR ART

It is well known that material, such as black paint, which closely resembles a complete black body, is applied on the radiation-collecting surface of hot water devices which are practically used for collecting the solar radiation. The radiation-collecting surface for solar radiation, which is provided with black paint, has a good absorption property of solar radiation, but the thermal loss due to emission of thermal energy from the radiation-collecting surface considerably increases as the temperature of the radiation-collecting surface is elevated. The collecting efficiency of a radiation-collecting black painted surface is, therefore, disadvantageously reduced, when the selective absorption surface must operate under such a high temperature as in the solar radiation utilization system. In order to effectively collect the solar radiation, there is a demand to develop such a radiation-collecting surface that not only the collection efficiency should be high but also the emittance of the thermal energy absorbed in the radiation-collecting surface should be low. Radiation-collecting surfaces having a high collecting efficiency of solar radiation and a low emittance of the absorbed thermal energy have been hitherto referred to as the selective absorption surface, and the selective absorption surfaces with copper oxide, plated black nickel or vacuum-evaporated various metal oxides provided on a metal base are known. These selective absorption surfaces, however, involve problems of poor durability and adhesion properties. Their production also involves a number of difficulties in the formation of a uniform plated or vacuum evaporated film. It is particularly essential from the point of view of durability to prevent a decrease in collecting efficiency of the selective absorption surface due to rust formation during its service. The formation of the selective absorption film on a stainless steel sheet, which exhibits excellent corrosion resistance and rust proofing, is very advantageous from the point of view mentioned above.

It is proposed in Japanese Laid Open Patent Application Nos. 52-38652 and 55-6414 that a stainless steel sheet is subjected to a chemical conversion treatment within an alkaline oxidizing bath of a sodium hydroxide or potassium hydroxide solution, in which phosphate of either sodium or potassium, or nitrate or nitrite of either sodium or potassium is incorporated. The film formed in the alkaline oxidizing bath is, however, likely to have a poor uniformity and a so called "irregularity". In addition, since the composition of the alkaline oxidizing bath is complicated, the method of forming the film by means of the alkaline oxidizing bath necessitates an impractical control of the bath.

The method for forming a selective absorption film on a stainless steel sheet proposed in U.S. Pat. No. 3,210,200 is one using as chemical conversion bath an acidic oxidizing bath of a chromic anhydride-sulfuric acid solution. The method and product by means of an acidic oxidizing bath proposed in U.S. Pat. No. 4,097,313 discloses using a solution of sulfuric acid with sodium bichromate or potassium bichromate, in which the concentration of the sodium or potassium bichromate is from 100 to 400 g/l and the concentration of the sulfuric acid is from 400 to 800 g/l. When using these acidic oxidizing baths, a local corrosion, mainly the intergranular corrosion, of the stainless steel blank sheet takes place during the formation of the film, although the degree of corrosion is somewhat varied depending upon the the proportion of sulfuric acid to the chromic anhydride or bichromate. As a result of the local corrosion, the selective absorption property is lowered and proofing against the rust formation due to the presence of chlorine ions, as in the salt spray test, is deteriorated.

Conventionally, in order to assemble the pieces of selective absorption sheet made of metal, such as a stainless steel, as a heat collector, the metal sheet pieces cut into a predetermined dimension are shaped and welded to each other. The assembled selective absorption sheet pieces are then provided with a film on the surface thereof. Various improvements for reducing the production cost of the selective absorption sheet are performed, but the surface treatment cost of the conventional method, which accounts for a considerable proportion of the production cost, cannot be reduced to a level lower than a certain limit because of the following reasons. The chemical conversion treatment of the stainless steel sheet for forming the selective absorption film is carried out conventionally by dipping the shaped and assembled sheet pieces into the chemical conversion bath, so that the vessel containing the chemical conversion bath is required to have an extra space for the heat collector as well as a space for the volume of the sheet pieces. In addition, since air cannot be expelled from the interior of the heat collector, the apparent specific gravity of the heat collector is decreased, which leads the dipping operation to be complicated. Furthermore, the chemical conversion solution may be left in the clearances between the assembled sheet pieces after the chemical conversion or coloring treatment, so that rinsing of the heat collector after the chemical conversion treatment becomes difficult.

The coating method of the individual shaped sheet pieces is of a low production efficiency, because the shaped sheet pieces are coated and baked separately.

The problems of the conventional methods could be solved and the production cost of the heat collector could be decreased considerably, if the finished article, i.e. the solar collector, could be manufactured by preliminarily carrying out the coating or chemical conversion of a coil or cut sheets, then shaping and welding the coil or cut sheets with the coating film. Incidentally, most welding methods of the selective absorption sheet pieces presently carried out in practice are based on electric resistance heating, such as in the seam welding and spot welding. And, the selective absorption films presently used in practice are the acryl resin film with the mixed black pigments in the case of the black coating film and is mainly comprised of oxides or hydroxides of chromium or iron in the case of the chemical conversion film described hereinabove. These films are electrically insulating or semiconductive, so that their high electric resistance makes the seam or spot welding based on the electric resistance heating difficult.

SUMMARY OF THE INVENTION

The problems of the known method using the acidic oxidizing baths can be solved by the present invention.

It is one of the objects of the present invention to provide a method for producing a selective absorption sheet of solar radiation, which has a selective absorption property, durability, rust proofing and weldability improved over those of the known method.

It is another object of the present invention to provide a selective absorption sheet of solar radiation, in which not only the selective absorption property is improved but also durability, rust proofing and weldability are improved over those of the known method.

The first mentioned object is achieved in the present invention by providing a method for producing a selective absorption sheet of solar radiation, in which a stainless steel sheet is subjected to a chemical conversion treatment in an acidic oxidizing bath, which contains from 70 to 90 g/l of at least one member selected from the group consisting of sodium bichromate and potassium bichromate and from 550 to 630 g/l of sulfuric acid, at a temperature range of from 80 to boiling point of the acidic oxidizing bath (approximately 115° C.), thereby forming on the stainless steel sheet a film of metal oxides or metal hydroxides, in which film the metal is dispersed with a concentration gradient from the surface toward the interior of the film.

The second mentioned object is achieved in the present invention by the provision of a selective absorption sheet of solar radiation, comprising a base made of a stainless steel sheet and a selective absorption film which has a low electric resistance, and which comprises metal oxides or metal hydroxides finely dispersed in said film with a concentration gradient of metal from the surface toward the interior of said film.

DESCRIPTION OF PREFERRED EMBODIMENTS

In the present invention, in order to form a selective absorption film on a stainless steel sheet, the stainless steel sheet is dipped into an acidic oxidizing bath having the composition of:

(a) from 70 to 90 g/l, preferably about 80 g/l of sodium bichromate ($Na_2Cr_2O_7$) and/or potassium bichromate ($K_2Cr_2O_7$); and, (b) from 550 to 630 g/l, preferably about 600 g/l of sulfuric acid ($H_2SO_4$).

The industrial chemical purity of bichromates and sulfuric acid may be sufficient for the present invention, and tap water can be used for adjusting the bath concentration.

The temperature of the chemical conversion bath is from 80° C. to the boiling point of the acidic oxidizing bath and is preferably from 105 to 110° C. The chemical conversion treatment time is dependent on the bath composition and bath temperature of chemical conversion treatment, but usually it ranges from approximately 10 to 30 minutes. A bath temperature of below 80° C. is impractical, since a long time is necessary for forming a film having an excellent selective absorption property.

The reasons for limiting the above range of bath composition will now be explained. It is definitely necessary to prevent the formation of rust on the selective absorption surface during service of a solar collector, so that the selective absorption property of the solar collector can be maintained over a long period of time. It is, however, impossible to completely prevent infiltration of an acid gas, sea salt particles and moisture contained in the air into an encasement with a glass plate, in which the selective absorption sheets are generally mounted and are protected from the corrosive media. The moisture condensation in the encasement occurs at night in many cases, with the result that rust is formed on the surface of the heat collecting sheets during long service. The use of a stainless steel sheet, which has good rust proofing and corrosion resistance, is very advantageous in this regard. Nevertherless, even the stainless steel sheet are not free from a problem of rust proofing. This motivated the present inventors to perform research and, as a result of which they discovered that the rust proofing of selective absorption surface largely depends on the bath composition of the chemical conversion treatment.

Figure 1:
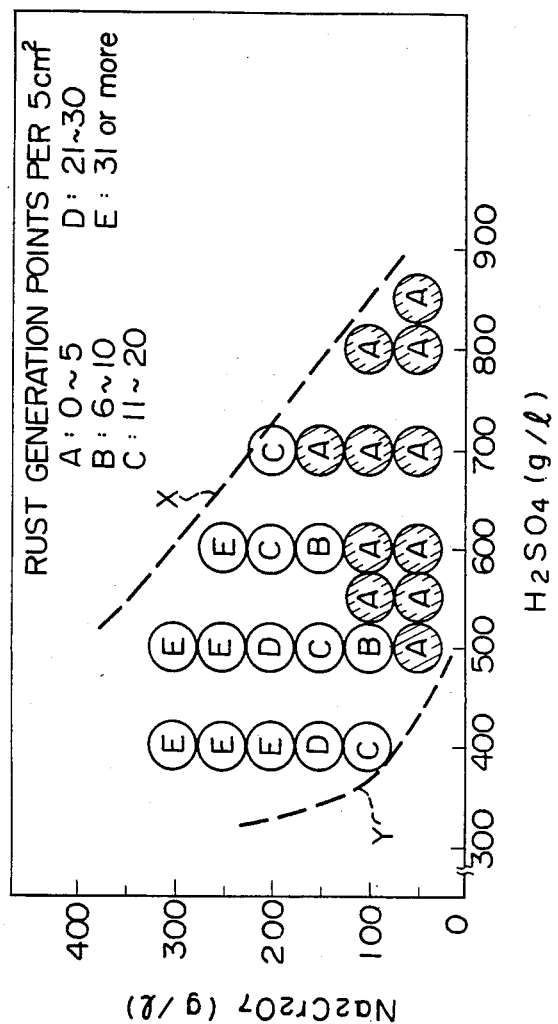
FIG. 1 illustrates rust proofing grades of a ferritic stainless steel sheet (19% Cr—2% Mo steel and No. 2 finish) which was subjected to a chemical conversion treatment by using the bath containing sodium bichromate and sulfuric acid at various concentrations and then subjected to a 24 hour immersion test in an aqueous solution of 5% sodium chloride and 0.2% hydrogen peroxide at 30° C.

Referring to FIG. 1, the results of accelerated tests for rust proofing of the film, which was formed by the chemical conversion treatment providing the highest selective absorption property, are illustrated. The grades of rust proofing were determined by the number of rust points or spots formed after dipping into the acidic oxidizing bath. A (19% Cr—2% Mo) stainless steel sheet not undergoing chemical conversion treatment, i.e. a blank sheet, which was also subjected to the accelerated test, exhibited grade A (0~5 rust points per 5 cm$^2$). The rust proofing equivalent to that of the blank sheet could be provided by the bath composition of chemical conversion treatment having a sodium bichromate concentration range of from 50 to 100 g/l and the sulfuric acid concentration range of from 500 to 850 g/l.

Figure 2:
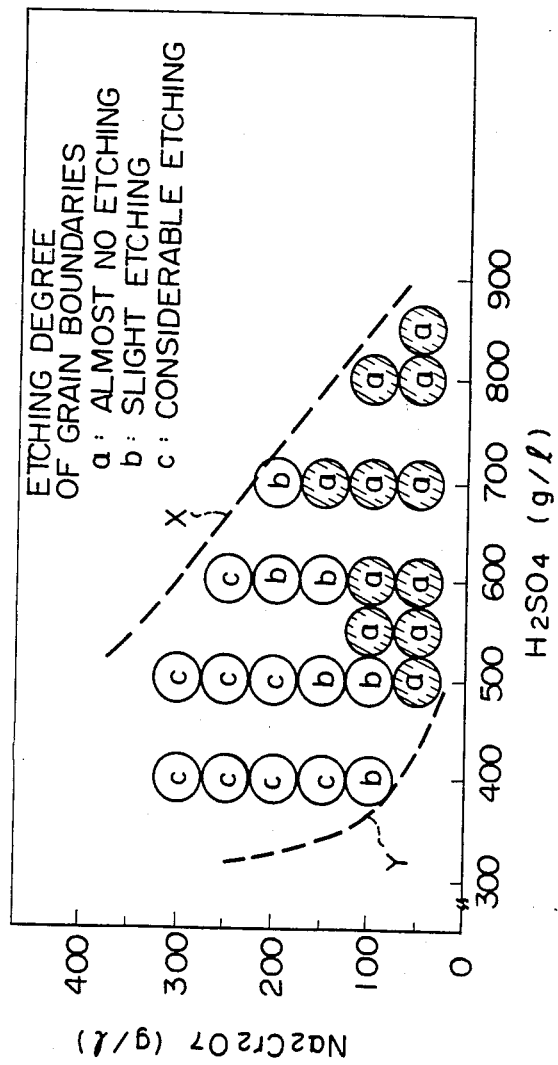
FIG. 2 is a drawing illustrating the etching degree of grain bounderies of the ferritic stainless steel after the chemical conversion mentioned above.

The rust proofing of the selective absorption film can also be determined by the etching degree of grain boundaries of the stainless steel. The results of the microscopic observation of the stainless steel, which has been subjected to the chemical conversion treatment, is shown in FIG. 2. The present inventors discovered that the orignating points or spots of rust correspond to the location, where the grain boundaries or non metallic inclusions are locally dissolved into the acidic oxidizing bath so that minute pores are formed. The claimed concentration range of the sodium bichromate and sulfuric acid is determined to provide the bath composition of the chemical conversion treatment, in which range the possibility of forming the originating points of rust is very low. An electronmicroscopic observation of carbon replica demonstrates minute pores which are fewer in the present invention than in the known method. The minute pores are preferably fifty per $\mu m^2$ on the surface of film in the present invention, while the minute pores are about five hundreds per $\mu m^2$ in the known method.

Figure 3:
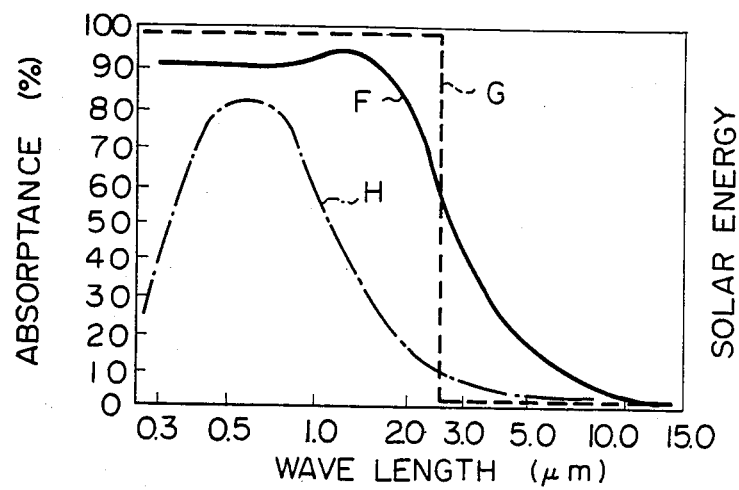
FIG. 3 illustrates a solar energy distribution profile used for the explanation of selective absorption and also illustrates how the ideal absorptance and the absorptance of an example of a selective absorption sheet according to the present invention vary depending upon the wave length of an electromagnetic wave.

The selective absorption property of a solar radiation is largely dependent upon the bath composition of the chemical conversion treatment. The solar radiation has an energy distribution as shown by the curve H in FIG. 3. As is well known, the selective absorption property of solar radiation has such a characteristic that the absorption property is high at the short-wave length side of from 0.3 to 2.5 $\mu m$, where the solar energy is concentrated, while absorption property is low, i.e. reflectance is high, at the long-wave length side of more than 2.5 $\mu m$, thereby preventing emission of heat. The broken line G in FIG. 3 indicates the ideal selective absorptance curve which is obtained by a theoretical calculation. The curve F indicates the measured absorptance of an example of the selective absorption film according to the present invention.

Generally, the heat collecting property of a heat collecting surface is indicated by an average absorptance taking into consideration the solar energy distribution. Desirably, a parameter used for evaluating the selective absorption property is such that the emission of heat is taken into consideration. The parameter usually used for evaluating the selective absorption property is the ratio of absorptance to emittance. This parameter is however impractical, because it varies largely in accordance with the change of emittance, when the emittance is lower than 20%, which however does not appreciably exert an influence upon the heat collecting property at a relatively low heat collecting temperature of up to 100° C. according to the aim of the present invention. The present inventors devised the r value explained below, as a new parameter for evaluating the selective absorption property of solar radiation and measured the r value of the selective absorption sheets obtained by the method of present invention. Incidentally, the r value disclosed herein is essentially the same as r value disclosed in Japanese Patent Application No. 53-71000 (Japanese Laid Open Patent Application No. 54-163440) but is slightly modified from this application. Namely, the r value previously disclosed corresponds to P of the formula (4) shown, below, and has a corelationship with the herein disclosed r value as indicated by formula (5) shown below. Both r values are, therefore, proportional to one another. The herein disclosed r value is characterized by easiness in measurement and good sensitivity. The herein disclosed r value, hereinafter simply referred to as the r value, can be measured by the method disclosed in Japanese Patent Application No. 53-71000 (Japanese Laid Open Patent Application No. 54-163440) and by using as an additional standard sample a white plate.

The r value, which is now explained in detail, is defined by:

$$r = \frac{t_s - t_w}{t_b - t_w}, \quad (1)$$

wherein
$t_s$: temperature of the selective absorption surface without a load,
$t_b$: temperature of the black surface without a load, and
$t_w$: temperature of the white surface without load.

The r value shown in formula (1) is proportional to the maximum obtainable temperature of a selective absorption-heat collecting sheet, which temperature is standardized by the maximum obtainable temperature of a heat collecting sheet with black coating. The characteristic values of the selective absorption-heat collecting sheet and the heat collecting sheet with black coating are defined by formulas (2) and (3), respectively. Then, the parameter for evaluating the selective absorption property is defined by formula (4).

$$X_s = (t_s - t_o)/I \quad (2)$$

$$X_b = (t_b - t_o)/I \quad (3)$$

In formulas (2) and (3), $t_o$ is the ambient temperature, I is the solar irradiation quantity and $t_s$, $t_b$ have the same meaning as in formula (1).

$$P = X_s/X_b \quad (4)$$

The r value shown in (1) has the same relationship with P as is shown in formula (5).

$$P = ar + b \tag{5}$$

In formula (5), a and b are constants. As is apparent from formula (5), P, which indicates the selective absorption property, is proportional to the r value shown in formula (1), and, therefore, the higher the r value is, the better selective absorption property. The r value can be obtained by exposing a selective absorption-heat collecting surface, a white sheet and a black sheet to solar light and then measuring the surface temperature of the respective sheets.

Figure 4:
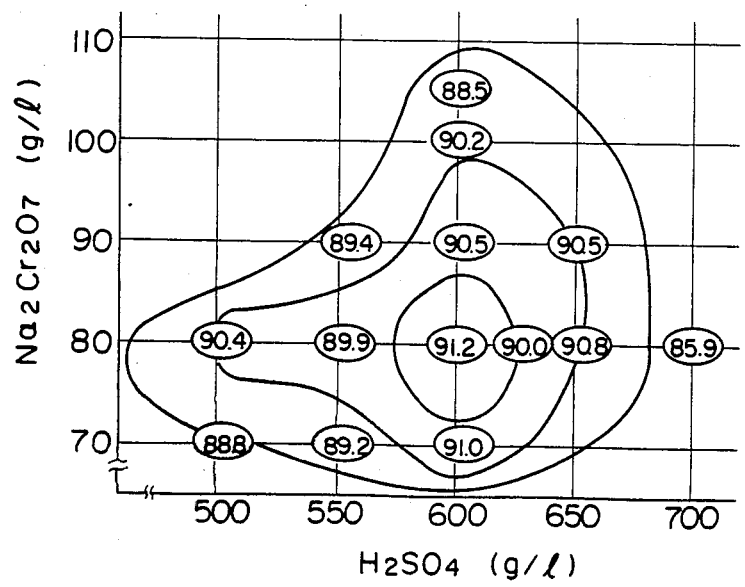
FIGS. 4 and 5 are contour-line drawings of the absorptance of solar radiation and the r value (selective absorption parameter), respectively, of a ferritic stainless steel sheet (19% Cr—2% Mo steel and No. 2 finish) which has been subjected to the chemical conversion treatment in a bath comprising sodium bichromate and sulfuric acid at various concentrations.
Figure 5:
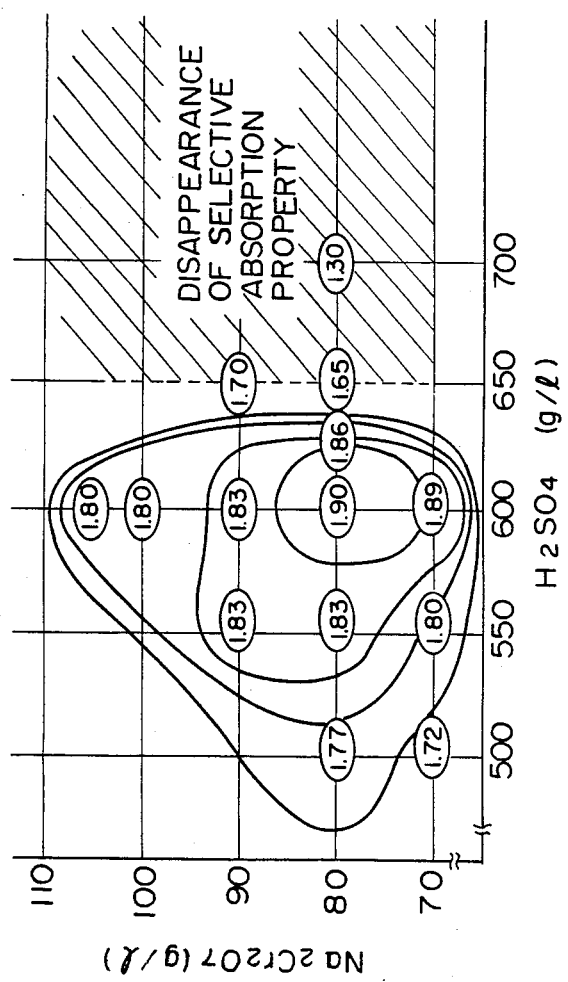

FIG. 4 and FIG. 5 illustrate the dependency of the previously used absorptance and the r value (a parameter for evaluating the selective absorption as explained hereinabove), respectively, upon the bath composition of chemical conversion treatment. The previously used absorptance and r value exhibit a dependency substantially coincident with one another and peak values at a bath composition of 80 g/l of sodium bichromate and 600 g/l. In addition, the selective absorption property in terms of the previously used absorptance and the r value is decreased as the contour lines showing concentrations of sodium bichromate and sulfuric acid are distant from those exhibiting the peak value mentioned above. The r value is preferably approximately 1.80 or more for the selective absorption property. From the recognition of the dependency of the r value and also the rust proofing illustrated in FIGS. 1 and 2, the bath composition of chemical conversion treatment is selected so that the sodium or potassium bichromate ranges from 70 to 90 g/l and sulfuric acid ranges from 550 to 630 g/l.

Figure 6:
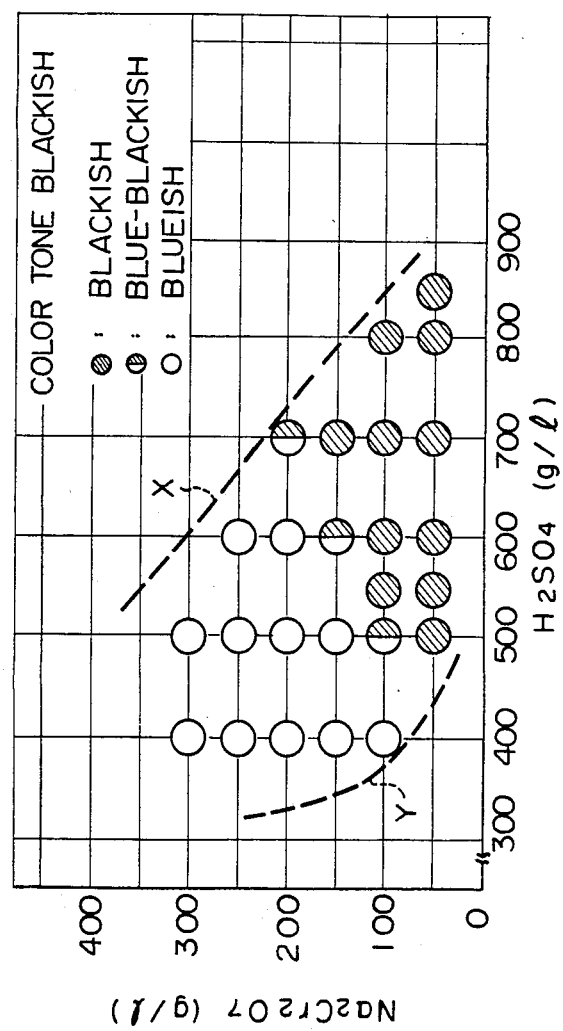
FIG. 6 is a drawing illustrating how a color tone imparted by the chemical conversion treatment is varied depending upon the bath composition of chemical conversion treatment.

FIG. 6 illustrates how the color tone of the heat-collecting selective absorption sheet varies in accordance with the bath composition of the chemical conversion treatment. As being apparent from FIG. 6, the color tone is blackish when the bath composition of chemical conversion treatment falls within the range of the present invention. The change of color tone or film thickness in accordance with the change of the composition mentioned above is very slight as compared with that in using the known composition of U.S. Pat. No. 4,097,311. Also, it is easy to control the film thickness in the present invention.

Figure 7:
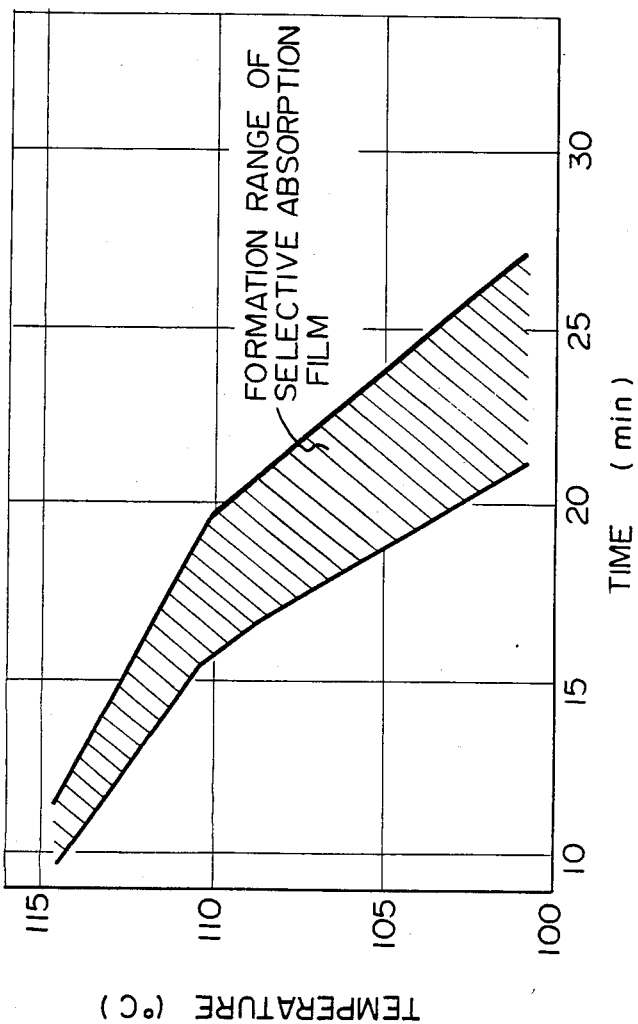
FIG. 7 is a drawing illustrating the relationship of the bath temperature to the chemical conversion treatment time at the optimum concentration of the bath (80 g/l of sodium bichromate and 600 g/l of sulfuric acid).

FIG. 7 illustrates the results of examination how the length of time of chemical conversion treatment in the optimum bath composition of chemical conversion treatment (80 g/l of sodium bichromate and 600 g/l of sulfuric acid) is varied in accordance with the bath temperature. As is apparent in FIG. 7, the length of time of chemical conversion treatment is increased with the decrease in the bath temperature. On the other hand, with the increase in the bath temperature, the time is decreased, and simultaneously the time period necessary for the formation of a selective absorption film is decreased. The length of time of the chemical conversion treatment is desirably short in the light of the production cost of the selective absorption heat collecting sheet. However, in order to carry out a stable operation of chemical conversion treatment and to ensure a satisfactory recovery, an appropriate length of time of chemical conversion treatment is from 16 to 24 minutes under the condition that the bath temperature is from 105° to 110° C.

Although the acidic oxidizing bath mainly explained hereinabove is one containing sodium bichromate and sulfuric acid, the same effects can be achieved by replacing a part or all of the sodium bichromate with potassium bichromate.

The curve X shown in FIGS. 1, 2 and 6 is the solubility curve of sodium bichromate and the curve Y indicates a time longer than 40 minutes necessary for the chemical conversion treatment.

The concentration of sodium bichromate of from 70 to 90 g/l according to the present invention is lower than the known concentration in U.S. Pat. No. 4,097,311, which contributes to provide the selective absorption sheet with a very excellent selective absorption property and rust proofing. This is one of the greatest features as understood from the explanation hereinabove. Another feature is that the weldability of the selective absorption sheet is substantially as good as in the blank sheet, with the consequence that the solar collector can be easily assembled and manufactured by various welding methods after the chemical conversion treatment. The weldability is now explained.

Figure 8:
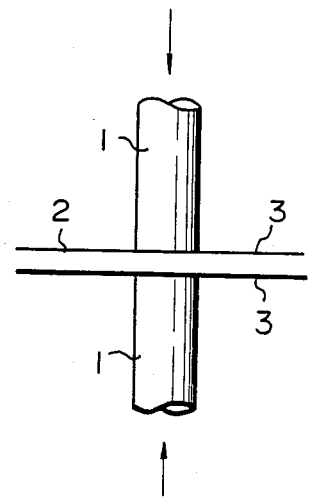
FIG. 8 is a drawing illustrating the measuring method of the electric resistance of the selective absorption film carried out in the examples of the present invention.

In order to evaluate the weldability, the electric resistance of selective absorption films was measured by the method illustrated in FIG. 8. The bar electrodes 1,1 having diameter of 4.5 mm were disposed above and below the specimen 2 as shown in FIG. 8 and the bar electrodes 1,1 were contacted with the specimen 2 at a load of 200 kg. A current of 1 A was conducted through the bar electrodes and the electric resistance was measured when three seconds had lapsed after the initiation of the current conduction. Such measurement revealed that: the resistance of a 0.3 mm thick ferritic stainless steel sheet was approximately 2 mΩ (approximately 0.32 mΩ/cm$^2$); and, the resistance of such sheet with a 1000 Å thick chromium oxide film 3 (FIG. 8) on both sheet surfaces was from approximately 20 to 300 mΩ (3.2~31.8 mΩ/cm$^2$). When the resistance is not more than 10 mΩ (1.6 mΩ/cm$^2$), preferably not more than 5 mΩ (1 mΩ/cm$^2$), both seam welding and spot welding are possible. When the resistance is from 10 to 100 mΩ (1.6 to 15.9 mΩ/cm$^2$), welding becomes difficult in some instances. Welding is impossible at the resistance of 100 mΩ (15.9 mΩ/cm$^2$) or higher.

Figure 9A:
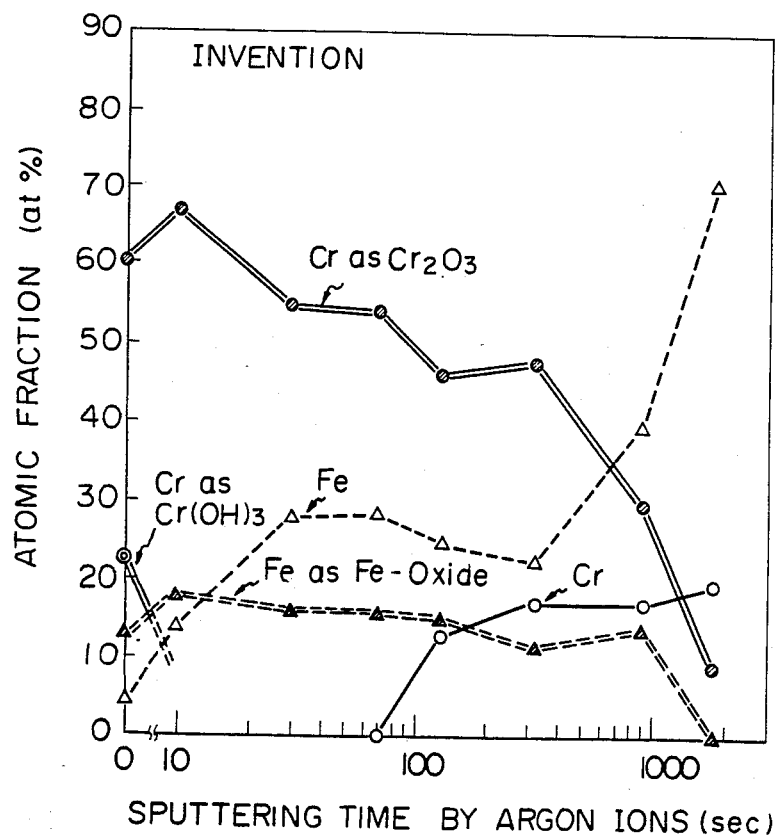
FIG. 9A illustrates the concentration profile of the components of a selective absorption film of the present invention in the direction perpendicular to the film surface.
Figure 9B:
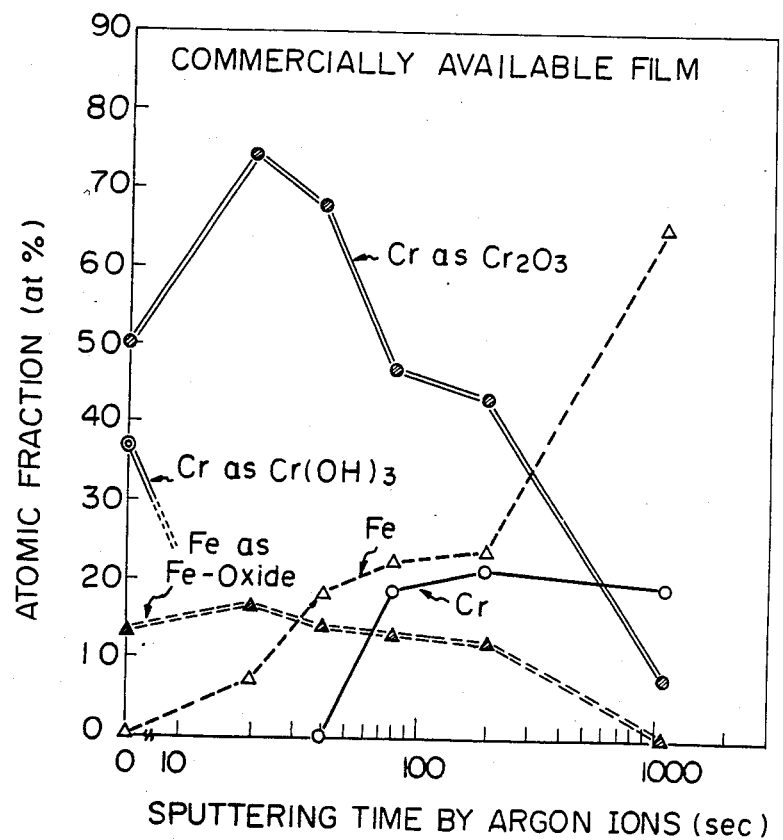
FIG. 9B illustrates the concentration of the components of a commercially available selective absorption film of a solar radiation collector panel.

In the present invention, a special selective absorption film explained hereinafter can be obtained by dipping a stainless steel sheet, which contains from 16 to 24% of chromium, into the acidic oxidizing bath having the composition explained hereinabove and containing from 70 to 90 g/l of sodium and/or potassium bichromate and from 550 to 630 g/l of sulfuric acid. Referring to FIGS. 9A and 9B, concentration profiles of the components of a selective absorption film according to the present invention and of a commercially available solar radiation-absorption film are illustrated. These concentration profiles were obtained by sputtering argon ions onto the films and removing the film at a rate of 1 Å/sec, and these concentrations are indicated in FIGS. 9A and 9B as a function of the sputtering time. As is apparent from FIGS. 9A and 9B, about 3 atomic % of iron (the atomic percentage is based on the total of metals (Cr, Fe) and the metallic components (Cr, Fe) of the Cr—, Fe oxides) based on the components of the film is present at zero of the argon ion sputtering time, i.e. on the surface of the film according to the present invention. In addition, the iron component is increased gradually at the inner portion of the film. The presence of iron on the surface of the film contributes to the reduction of electric resistance and improvement of weldability. Contrary to this, in the commercially available solar radiation-absorption film, no iron is present on the surface of the film which leads to an increase in electric resistance and thus deterioration of weldability. The concentration of metal on the surface of the selective absorption film is preferably from 3 to 10 atomic %. Such metal present on the surface of the selective absorption film is usually mainly iron. The metal concentration is increased toward its content of the base, as the analysis place of the metal concentration is distant or separated from the surface of the selective absorption film. The selective absorption film has preferably a thickness of from 1000 to 2500 Å.

Now, the durability of a selective absorption sheet will be explained.

A selective absorption sheet according to the present invention and commercially available solar radiation absorption panels provided with a film, which was similar to the film of U.S. Pat. No. 4,097,311, were heated to various levels of temperature over a period of 1000 hours and then the stability of the color tone was measured. The measurement results are shown in Table 1.

TABLE 1

The color tone stability of sheets colored according to the invention and of a commercially available colored sheet

| Sheet | Temperature (°C.) | | | | |
|---|---|---|---|---|---|
| | 150 | 180 | 230 | 250 | 300 |
| Invention | o | o | o | Δ | x |
| Prior Art-1 | o | Δ | x | x | x |
| Prior Art-2 | o | Δ | x | x | x | o; No change in color tone
Δ; Slight change in color tone
x; Complete color change As is apparent from Table 1, the film of the present invention only exhibited a slight color change upon heating to 250° C. over a period of 1000 hours and the color change degree was of practically no problem. Contrary to this, a complete color change took place upon the heating of the commercially available panels at 230° C., which would later result in problems during its use.

It is reported in U.S. Pat. No. 4,097,311 that the selective absorption property is largely influenced by the surface property, mainly the surface roughness, and by the pretreatment of a stainless steel sheet according to the chemical conversion treatment of the U.S. patent. In the present invention, the rust proofing and selective absorption property explained above can be achieved, and no pretreatment, such as degreasing, is necessary, when the surface finish of a stainless steel sheet is equivalent to or better than No. 4B finish of JIS G 4305 (Cold Rolled Stainless Steel Sheets and Plates). The present invention is, therefore, very advantageous from the industrial point of view. Incidentally, the surface roughness of a stainless steel used in the method of the present invention is advantageously from Ra approximately 0.08 to 0.5.

In the method of the present invention, a selective absorption film can be formed on one surface of a stainless steel sheet. Namely, when, prior to forming a colored film on the stainless steel sheet, such sheet is subjected to the surface finishing so as to obtain the predetermined surface roughness degree, only the surface of the sheet, on which the colored sheet is to be formed, is ground and then an extremely thin oxide film (air formed film) is formed on the ground surface in ambient air. The stainless steel sheet is then dipped in an acidic oxidizing bath of the present invention over a predetermined time period and lifted up from the acidic oxidizing bath, with the result that the selective absorption film is formed only on one surface, namely the surface, on which the air formed film is formed, and no selective absorption film is formed on the other surface. It is, therefore, possible to form the selective absorption film only on one surface of a stainless steel sheet. This is because the reaction takes place rapidly on the surface with air formed film, which results in a difference in the reaction time for forming the film on such surface from that on the surface without the air formed film.

The present invention is now explained by way of Examples.

EXAMPLE 1

Stainless steel sheets (19% Cr—2% Mo —Ti, B steel with No. 2 finish) having a thickness of 0.3 mm were subjected to a chemical conversion treatment in baths comprising various concentrations of sulfuric acid and sodium bichromate or potassium bichromate. Subsequently, the measurement of optical properties (absorptance and emittance) by an emission spectroscopic test, the measurement of rust proofing by an immersion test in a 5% sodium chloride-0.2% hydrogen peroxide solution as well as the r values obtained by the measurement of the surface temperature by solar radiation were carried out. The measurement results are shown in Table 2.

TABLE 2

| | No. | Bath Composition (g/l) | | | Bath Temperature (°C.) | Dipping Time (min) | Absorptance (%) | Emittance (%) | Grades of Rust Proofing | r-Value | Electric Resistance of Film (mΩ/cm²) | Heat Resisting Property (230° C. × 1000h) |
|---|---|---|---|---|---|---|---|---|---|---|---|---|
| | | Na₂Cr₂O₇ | K₂Cr₂O₇ | H₂SO₄ | | | | | | | | |
| Inventive | 1 | 70 | | 550 | 110 | 21 | 89.2 | 11.0 | A | 1.80 | 0.49 | o |
| Range | 2 | 80 | | " | " | 22 | 89.9 | 10.6 | " | 1.83 | 0.50 | o |
| | 3 | 90 | | " | " | 17 | 89.4 | 10.5 | " | 1.83 | 0.52 | o |
| | 4 | 70 | | 600 | " | 21 | 91.0 | 13.3 | " | 1.89 | 0.48 | o |
| | 5 | 80 | | " | " | 19 | 91.2 | 13.0 | " | 1.90 | 0.49 | o |
| | 6 | 90 | | " | " | 17 | 90.5 | 15.0 | " | 1.83 | 0.53 | o |
| | 7 | 80 | | 630 | " | 19 | 90.0 | 13.0 | " | 1.86 | 0.48 | o |
| | 8 | | 80 | 550 | " | 23 | 89.8 | 12.1 | " | 1.81 | 0.51 | o |
| | 9 | | 80 | 600 | " | 22 | 90.0 | 12.4 | " | 1.89 | 0.50 | o |
| Range | 10 | 70 | | 500 | 110 | 25 | 88.8 | 10.2 | B | 1.72 | 0.52 | o |
| outside | 11 | 80 | | 650 | " | 19 | 90.8 | 30.0 | A | 1.65 | 0.48 | o |
| Invention | 12 | 80 | | 700 | " | 15 | 85.9 | 60.0 | " | 1.30 | 0.47 | o |
| | 13 | 100 | | 600 | " | 15 | 90.2 | 15.0 | " | 1.79 | 4.5 | Δ |
| | 14 | 150 | | 400 | 90 | 16 | 88.5 | 14.3 | D | 1.80 | 13.0 | x |

TABLE 2-continued

| | No. | Bath Composition (g/l) | | | Bath Temperature (°C.) | Dipping Time (min) | Absorptance (%) | Emittance (%) | Grades of Rust Proofing | r-Value | Electric Resistance of Film (mΩ/cm$^2$) | Heat Resisting Property (230° C. × 1000h) |
|---|---|---|---|---|---|---|---|---|---|---|---|---|
| | | Na$_2$Cr$_2$O$_7$ | K$_2$Cr$_2$O$_7$ | H$_2$SO$_4$ | | | | | | | | |
| | 15 | 200 | | 400 | " | 13 | 87.8 | 13.5 | E | 1.81 | 14.5 | x |
| | 16 | 300 | | 500 | " | 11 | 88.2 | 13.0 | E | 1.78 | 16.0 | x |
| | 17 | | 80 | 500 | 110 | 25 | 88.8 | 12.5 | B | 1.75 | 0.51 | o |
| | 18 | | 80 | 700 | " | 17 | 85.2 | 61.2 | A | 1.25 | 0.47 | o |
| | 19 | | 100 | 600 | " | 17 | 88.7 | 17.0 | A | 1.74 | 9.5 | Δ |

In the films obtained by the method of present invention, the absorptance was higher than about 90%, the emittance was lower than about 15%, the grade of rust proofing was A, and the r value was 1.80 or higher. Some, but not all, of these properties of each film of the comparative method are equivalent to those of the present invention. In addition, the weldability in terms of the electric resistance of the film, as well as the durability in terms of heat resistance during heating at 230° C. for 100 hours, were good in the present invention.

EXAMPLE 2

The same experiments as in Example 1 were carried out using 0.3 mm thick JIS 304 stainless steel sheets with BA finish. The results of the experiments are shown in Table 3.

tance of the JIS 304 stainless steel blank sheet was inferior to the ferritic stainless steel mentioned above. The weldability in terms of the electric resistance of film, as well as the durability in terms of heat resistance during the heating at 230° C. for 1000 hours, were good in the present invention.

EXAMPLE 3

The same experiment as in Example 1 was carried out using the 0.3 mm thick JIS SUS 430 stainless steel sheets with No. 2 finish.

The obtained results, shown in Table 4, below, were similar to those in Example Nos. 1 and 2, namely, some of, but not all of, the properties of each film obtained by the comparative method were equivalent to those obtained by the chemical conversion treatment with the

TABLE 3

| | No. | Bath Composition (g/l) | | | Bath Temperature (°C.) | Dipping Time (min) | Absorptance (%) | Emittance (%) | Grades of Rust Proofing | r-Value | Electric Resistance of Film (mΩ/cm$^2$) | Heat Resisting Property (230° C. × 1000h) |
|---|---|---|---|---|---|---|---|---|---|---|---|---|
| | | Na$_2$Cr$_2$O$_7$ | K$_2$Cr$_2$O$_7$ | H$_2$SO$_4$ | | | | | | | | |
| Inventive | 1 | 80 | | 550 | 110 | 15 | 90.0 | 13.5 | B | 1.85 | 0.51 | o |
| Range | 2 | 80 | | 600 | " | 15 | 91.0 | 12.5 | B | 1.89 | 0.45 | o |
| | 3 | | 80 | 550 | " | 16 | 90.5 | 12.7 | B | 1.87 | 0.50 | o |
| | 4 | | 80 | 600 | " | 16 | 91.2 | 12.8 | B | 1.88 | 0.48 | o |
| Range | 5 | 80 | | 500 | 110 | 16 | 87.7 | 13.8 | C | 1.76 | 0.51 | o |
| outside | 6 | 80 | | 700 | " | 13 | 87.3 | 55.8 | B | 1.27 | 0.44 | o |
| Invention | 7 | 100 | | 600 | " | 13 | 87.5 | 15.5 | B | 1.77 | 3.5 | Δ |
| | 8 | 200 | | 400 | 90 | 11 | 87.9 | 13.4 | E | 1.76 | 15.0 | x |
| | 9 | 300 | | 500 | " | 10 | 88.1 | 13.1 | E | 1.78 | 14.0 | x |
| | 10 | | 80 | 500 | 110 | 17 | 88.7 | 12.9 | C | 1.80 | 0.53 | o |
| | 11 | | 80 | 700 | " | 15 | 85.1 | 61.5 | B | 1.22 | 0.47 | o |

The absorptance was 90% or higher and the emittance was lower than 15%, when the bath composition of chemical conversion treatment fell within the range of the present invention. In addition, the r value was 1.80 or higher. These results are comparable to those in Example 1 using the ferritic stainless steel sheets (19% Cr—2% Mo—Ti,Nb steel). The grade of rust proofing in the present example was B, which is inferior by one grade to that of Example 1 because the corrosion resistance of the JIS 304 stainless steel blank sheet was inferior to the ferritic stainless steel mentioned above.

bath composition falling within the range of the present invention. The absorptance was about 90% or higher, the emittance was about 15% or lower, the r value was 1.80 or higher and the grades of rust proofing were C and D. The rust proofing in the present example was similar to that in Example 1, because the corrosion resistance of the SUS 430 stainless blank steel sheet is inferior to that of the ferritic 19% Cr—2% Mo—Ti,B stainless steel.

TABLE 4

| | No. | Bath Composition (g/l) | | | Bath Temperature (°C.) | Dipping Time (min) | Absorptance (%) | Emittance (%) | Grades of Rust Proofing | r-Value | Electric Resistance of Film (mΩ/cm$^2$) | Heat Resisting Property (230° C. × 1000h) |
|---|---|---|---|---|---|---|---|---|---|---|---|---|
| | | Na$_2$Cr$_2$O$_7$ | K$_2$Cr$_2$O$_7$ | H$_2$SO$_4$ | | | | | | | | |
| Inventive | 1 | 80 | | 550 | 110 | 8 | 89.5 | 14.2 | D | 1.83 | 0.52 | o |
| Range | 2 | 80 | | 600 | " | 8 | 90.5 | 13.3 | C | 1.84 | 0.47 | o |
| | 3 | | 80 | 550 | " | 9 | 88.8 | 13.0 | C | 1.80 | 0.51 | o |
| | 4 | | 80 | 600 | " | 9 | 89.6 | 14.5 | C | 1.81 | 0.49 | o |
| Range | 5 | 80 | | 500 | 110 | 9 | 87.5 | 14.8 | D | 1.78 | 0.53 | o |
| outside | 6 | 80 | | 700 | " | 7 | 87.2 | 55.9 | D | 1.26 | 0.43 | o |
| Invention | 7 | 100 | | 600 | " | 7 | 85.5 | 15.7 | D | 1.73 | 3.5 | Δ |
| | 8 | 200 | | 400 | 90 | 6 | 86.7 | 15.8 | E | 1.72 | 15.6 | x |
| | 9 | 300 | | 500 | " | 5 | 87.1 | 14.0 | E | 1.74 | 14.3 | x |
| | 10 | | 80 | 500 | 110 | 10 | 87.8 | 13.9 | D | 1.75 | 0.54 | o |

TABLE 4-continued

| No. | Bath Composition (g/l) | | | Bath Temperature (°C.) | Dipping Time (min) | Absorptance (%) | Emittance (%) | Grades of Rust Proofing | r-Value | Electric Resistance of Film (mΩ/cm²) | Heat Resisting Property (230° C. × 1000h) |
|---|---|---|---|---|---|---|---|---|---|---|---|
| | Na₂Cr₂O₇ | K₂Cr₂O₇ | H₂SO₄ | | | | | | | | |
| 11 | | 80 | 700 | " | 8 | 84.7 | 62.3 | D | 1.20 | 0.46 | o |

EXAMPLE 4

Figure 10:
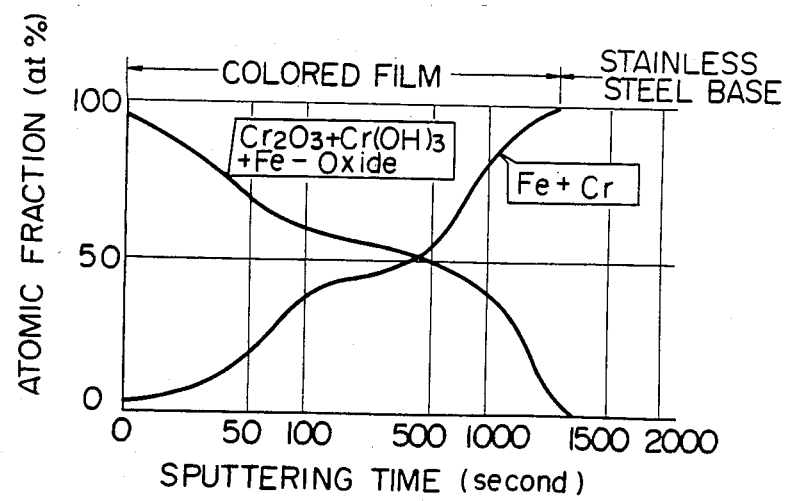
FIG. 10 is a drawing illustrating the concentration profile of the film obtained in Example 4 in the direction perpendicular to the film surface.

A ferritic stainless steel sheet was dipped over a period of 18 minutes in a bath comprising 80 g/l of sodium bichromate and 600 g/l of sulfuric acid at 110° C., thereby forming a selective absorption film on the surface of the steel sheet. The composition of the film was measured by an electron beam spectrometer (ESCA) along the vertical direction of the film. The measurement result is shown in FIG. 10. The abscissa in FIG. 10 indicates the argon ion sputtering time at a removing rate of the film amounting to 1 Å/sec, while the ordinate indicates the atomic fraction of the chromium plus iron or hydroxides plus oxides based on the components of the film. The curve "Fe+Cr" in FIG. 10 represents the metallic iron and metallic chromium, and they are contained in a large quantity in the film, and their concentration is increased and the concentration of the hydroxides and oxides of chromium and iron is correspondingly decreased as the measuring depth approaches the base or blank sheet. The selective absorption property is enhanced and the electric resistance is decreased due to the presence of the metallic iron and the metallic chromium. Incidentally, the absorptance of solar light was 91.5% and the electric resistance was 0.5 mΩ/cm² in the present example.

We claim:

1. A metal sheet adapted to selectively absorb solar radiation comprising a stainless steel sheet base containing iron and chromium and a selective absorption film formed on said base, wherein said selected absorption film
   is a chemical conversion film which comprises a chromium oxide, an iron oxide, a chromium hydroxide, metallic iron, and metallic chromium;
   has a concentration profile thereacross, so that the total concentration of said metallic iron and said metallic chromium is from 3 to 10 atomic % at an outer surface thereof and is the same as that of said base at an inner surface thereof on said base, said concentration increasing in a direction from said outer surface to said inner surface;
   has a thickness of from 1000 to 2500 Å; and
   has an electric resistance not greater than 1.6 MΩ/cm².

2. A selective absorption sheet of solar radiation according to claim 1, wherein said metal, which is dispersed at the outer surface of said selective absorption film of solar radiation, is mainly iron.

3. A selective absorption sheet of solar radiation according to claim 1, wherein said stainless steel sheet, on which said selective absorption film is formed, has a surface roughness of from Ra 0.08 to 0.5.

4. A selective absorption sheet of solar radiation according to claim 1, wherein minute pores present on the surface of said selective absorption film are not more than fifty per μm² of said film.

5. A selective absorption sheet of solar radiation according to claim 1, wherein said selective absorption film is formed on only one surface of said base.

* * * * *